(12) United States Patent
Pai

(10) Patent No.: US 6,677,800 B1
(45) Date of Patent: Jan. 13, 2004

(54) TEMPERATURE SENSING CIRCUIT

(75) Inventor: Chung-Lung Pai, Taipei (TW)

(73) Assignee: Richtek Technology Corp., Chupei (TW)

( * ) Notice: Subject to any disclaimer, the term of this patent is extended or adjusted under 35 U.S.C. 154(b) by 0 days.

(21) Appl. No.: 10/271,981

(22) Filed: Oct. 17, 2002

(51) Int. Cl.$^7$ ................................................ H03K 3/42
(52) U.S. Cl. ...................... 327/512; 327/513; 323/312; 323/315
(58) Field of Search ................................. 327/512, 513; 323/312, 315, 316

(56) References Cited

U.S. PATENT DOCUMENTS 4,479,086 A * 10/1984 Nagano ........................ 323/316
5,446,368 A * 8/1995 Uscategui ..................... 323/315

* cited by examiner

Primary Examiner—Kenneth B. Wells
(74) Attorney, Agent, or Firm—Hunton & Williams LLP

(57) ABSTRACT

A temperature sensing circuit includes a current source for providing a bias current, a first transistor pair coupled to the current source, and a cascaded set of second transistor pairs coupled to the first transistor pair. The first transistor pair has a first emitter-base junction ratio between the transistors thereof. Each of the second transistor pairs has a respective second emitter-base junction ratio between the transistors thereof. A voltage output, which corresponds to temperature sensed by the temperature sensing circuit, and which is a function of the first emitter-base junction ratio of the first transistor pair and the second emitter-base junction ratios of the second transistor pairs, is obtained from a last one of the second transistor pairs in the cascaded set.

7 Claims, 6 Drawing Sheets

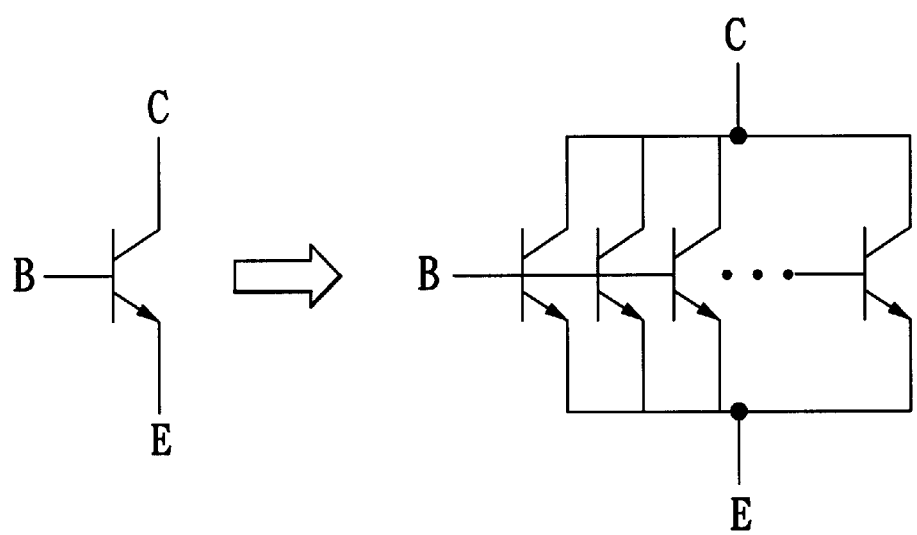
F I G. 3

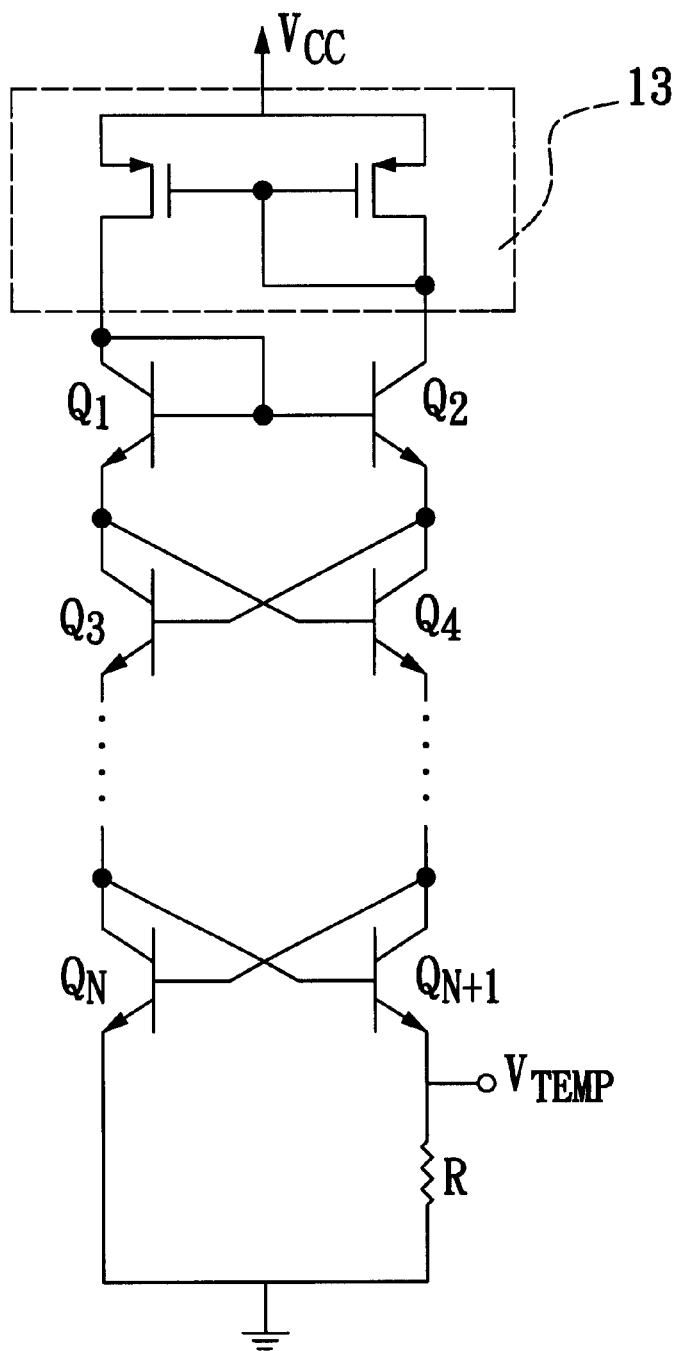
F I G. 5

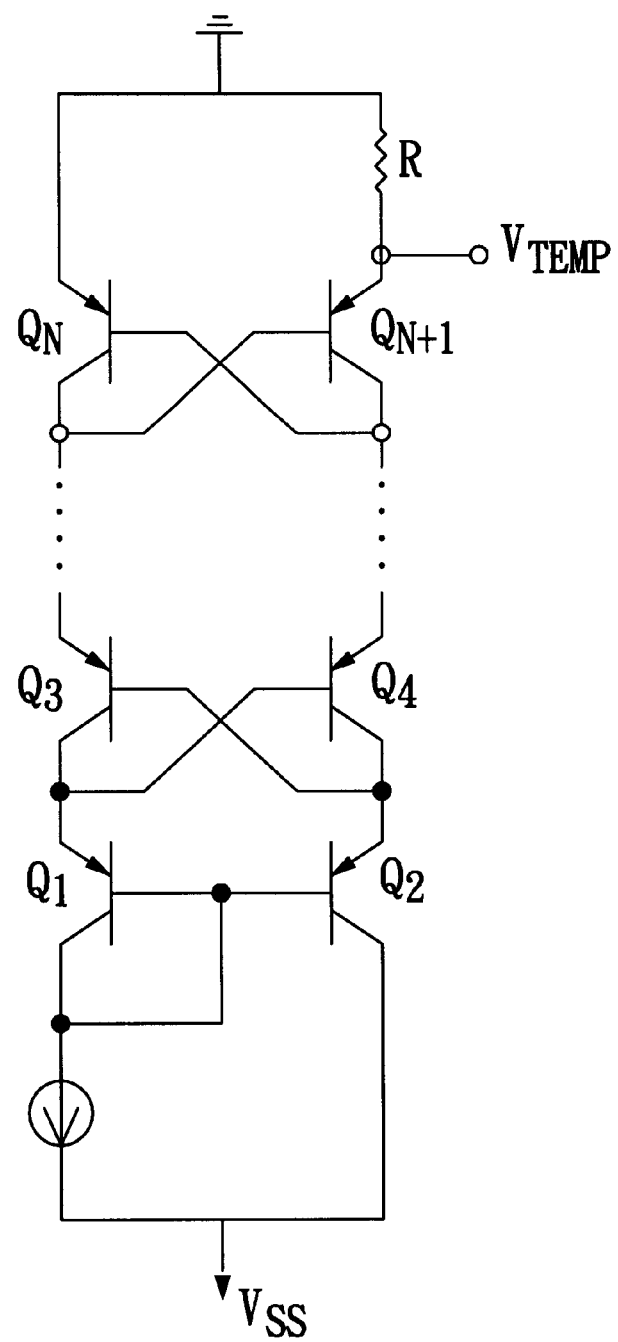
F I G. 6

TEMPERATURE SENSING CIRCUIT

BACKGROUND OF THE INVENTION

1. Field of the Invention

The invention relates to a temperature sensing circuit, more particularly to a temperature sensing circuit having relatively high accuracy that is not easily affected by component manufacturing tolerances.

2. Description of the Related Art

In recent years, rapid developments in integrated circuit technology have reached the stage where a single-packaged chip may contain millions of transistors. As such, when an integrated circuit configured with a large number of transistors operates at a clock rate of several hundred MHz, the amount of heat dissipated will be enormous to the extent that the operating temperature may exceed 100 degrees centigrade.

Due to the change in temperature, all components in the chip will be adversely affected, since temperature and conductivity have an inversely proportional relationship. Therefore, when temperature rises, the electrical characteristics of components will change accordingly. The most evident effect is that operating speed and overall efficiency are reduced.

Referring to FIG. 1, a conventional temperature sensing circuit 7 is shown to comprise a current mirror 71 and a Widlar current source 72 coupled thereto. As known to those skilled in the art, by matching transistors in the current mirror 71, the temperature sensing circuit 7 will have equal currents $I_1, I_2, I_3$, i.e., $I_1 = I_2 = I_3$. When the transistor ($Q_2$) of the Widlar current source 72 operates in the forward active region, the current ($I_2$) flowing through the transistor ($Q_2$) will be:

$$I_2 = \frac{1}{R_{13}} V_T \ln(n) \quad (1)$$

wherein n is the emitter-base junction ratio between the transistor ($Q_2$) and the transistor ($Q_1$), and the thermal voltage ($V_T$) is equal to 26 mV·T/300° K. Since the voltage ($V_{TEMP}$)=$I_3 \times R_{14} = I_2 \times R_{13}$, the following equation can be obtained:

$$V_{TEMP} = \frac{R_{14}}{R_{13}} V_T \ln(n) \quad (2)$$
$$= \frac{R_{14}}{R_{13}} \left( \frac{26\text{mV} \cdot T}{300° K} \right) \ln(n)$$

Therefore, the amount of change in the voltage ($V_{TEMP}$) is determined by the values of n and ($R_{14}/R_{13}$). In order to facilitate monitoring of the temperature change, it is preferable that when the temperature rises by 1° K, the voltage ($V_{TEMP}$) rises by 1 mV accordingly. In other words, ($R_{14}/RL_3$)·(26)·ln(n) must have a value of about 300. The relevant parameters in wide use to meet the above condition are: n=4, $R_{13}$=3.6 K, and $R_{14}$=30 K. By substituting these parameters into equation (2), the following equation can be obtained:

$$V_{TEMP} = 300\text{mV} \times \frac{T}{300° K} \quad (3)$$

Therefore, when the temperature rises by 1° K, the voltage ($V_{TEMP}$) rises by 1 mV. As such, when the temperature sensing circuit 7 is coupled to a main circuit (not shown) the operating temperature of the main circuit can be monitored by observing the voltage ($V_{TEMP}$) from the temperature sensing circuit 7 so that thermal protection of the main circuit can be activated when appropriate.

However, the foregoing analysis was made under ideal conditions in practice, due to manufacturing constraints, the actual output of the temperature sensing circuit 7 usually differs from the original design. It is noted that the accuracy of the voltage ($V_{TEMP}$) depends on the actual values of n and ($R_{14}/R_{13}$) Therefore, during manufacturing, if a lower value of ($R_{14}/R_{13}$) is desired, a higher value of n must be provided for compensation. For example, if ($R_{14}/R_{13}$) is set as 2, the value of n must be as high as 320 to satisfy the condition that when the temperature rises by 1° K, the voltage ($V_{TEMP}$) rises by 1 mV. Nevertheless, the value of n is determined by the physical characteristics of the transistors ($Q_2$) and ($Q_1$) and cannot be adjusted. If manufacture of the transistors ($Q_2$) and ($Q_1$) is based simply on the calculated values, the outcome will be a mismatch in the current gains of the transistors ($Q_2$) and ($Q_1$), thereby resulting in failure of the temperature sensing circuit 7 to operate normally and inability of the temperature sensing circuit 7 to serve the purpose of temperature measuring. Thus, to ensure the accuracy of the characteristic curve of the circuit, a value smaller than 10 is usually adopted for n. This introduces another design problem since the value of ($R_{14}/R_{13}$) must be correspondingly increased to satisfy the aforesaid requirement. However, in view of manufacturing constraints, it is known that the resistance values of resistors cannot be accurately controlled. Due to the requirement of a high resistance ratio, the resultant error tends to be too high. As such, the measured result of the temperature sensing circuit 7 is imprecise.

SUMMARY OF THE INVENTION

Therefore, the main object of the present invention is to provide a temperature sensing circuit having relatively high accuracy that is not easily affected by component manufacturing tolerances.

Accordingly, a temperature sensing circuit of this invention comprises a current source for providing a bias current, a first transistor pair coupled to the current source, and a cascaded set of second transistor pairs.

The first transistor pair includes first and second transistors. The first transistor has a first collector, a first base coupled to the first collector, and a first emitter. The second transistor has a second collector, a second base coupled to the first base of the first transistor, and a second emitter. The first transistor pair has a first emitter-base junction ratio between the first transistor and the second transistor.

A first one of the second transistor pairs in the cascaded set is coupled to the first transistor pair. Each of the second transistor pairs includes third and fourth transistors. The third transistor has a third collector, a third base and a third emitter. The fourth transistor has a fourth collector coupled to the third base of the third transistor, a fourth base coupled to the third collector of the third transistor, and a fourth emitter. The third and fourth emitters of the third and fourth transistors of each of the first through a second to a last one of the second transistor pairs in the cascaded set are coupled to the third and fourth collectors of an adjacent one of the second transistor pairs in the cascaded set, respectively. Each of the second transistor pairs has a respective second emitter-base junction ratio between the third transistor and the fourth transistor thereof. A voltage output, which corresponds to temperature sensed by the temperature sensing circuit and which is a function of the first emitter-base junction ratio of the first transistor pair and the second emitter-base junction ratios of the second transistor pairs, is obtained from the third and fourth emitters of the last one of the second transistor pairs in the cascaded set.

BRIEF DESCRIPTION OF THE DRAWINGS

Other features and advantages of the present invention will become apparent in the following detailed description of the preferred embodiments with reference to the accompanying drawings, of which:

FIG. 3 is a schematic diagram illustrating an equivalent circuit of a transistor having an N-times emitter-base junction;

FIG. 5 is a circuit diagram illustrating the temperature sensing circuit according to the present invention embodied with another example of a current source; and FIG. 6 is a circuit diagram illustrating another preferred embodiment of a temperature sensing circuit according to the present invention.

DETAILED DESCRIPTION OF THE PREFERRED EMBODIMENTS

Figure 1:
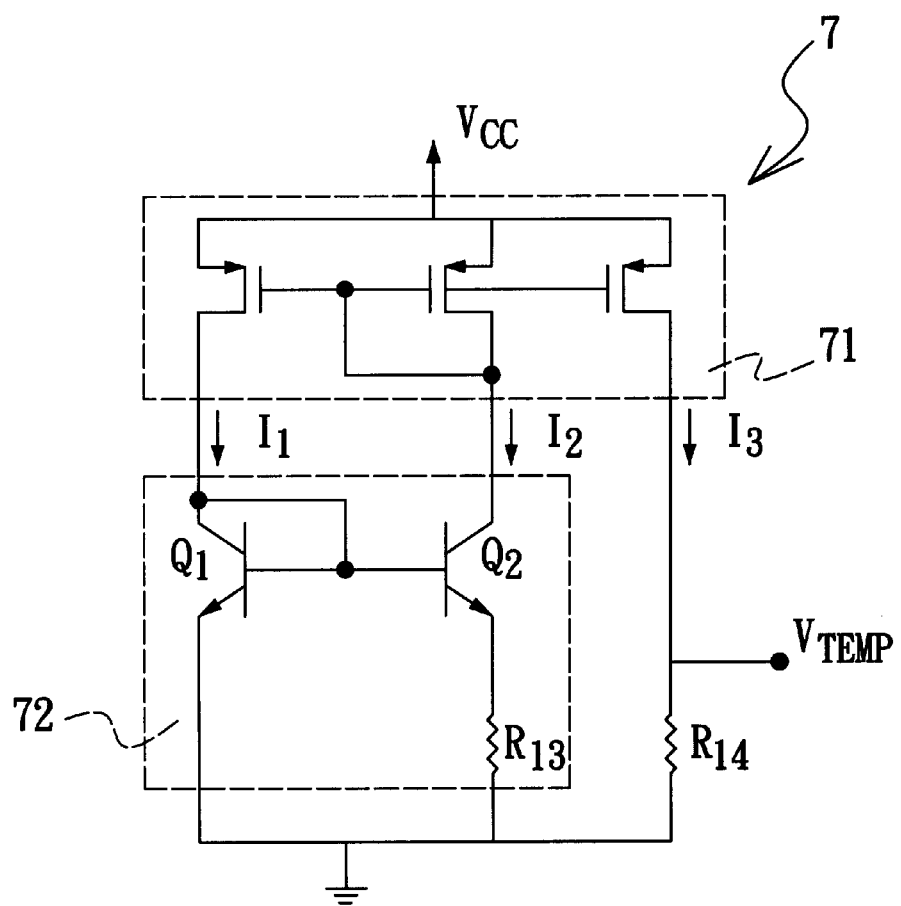
FIG. 1 is a circuit diagram illustrating a conventional temperature sensing circuit.
Figure 2:
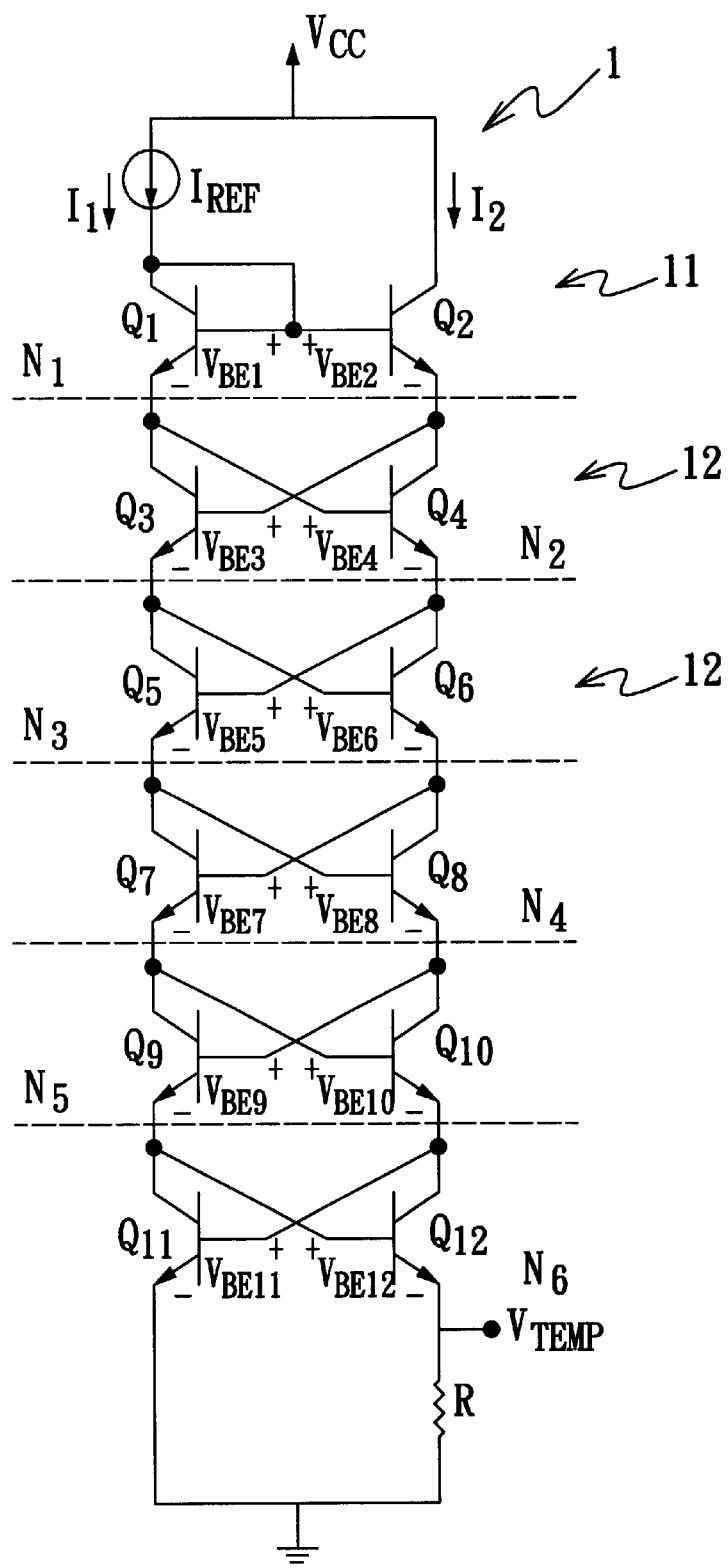
FIG. 2 is a circuit diagram illustrating a preferred embodiment of a temperature sensing circuit according to the present invention.

Referring to FIG. 2, the preferred embodiment of a temperature sensing circuit 1 according to the present invention is shown to include a current source ($I_{REF}$) a first transistor pair 11, and a cascaded set of second transistor pairs 12.

The current source ($I_{REF}$) is used to provide a bias current ($I_1$), which is a constant DC current. The first transistor pair 11 is coupled to the current source ($I_{REF}$) and includes a first transistor ($Q_1$) and a second transistor ($Q_2$). The first transistor ($Q_1$) has a first collector, a first base coupled to the first collector, and a first emitter. The second transistor ($Q_2$) has a second collector, a second base coupled to the first base of the first transistor ($Q_1$), and a second emitter. The first transistor pair 11 has a first emitter-base junction ratio ($N_1$) between the first transistor ($Q_1$) and the second transistor ($Q_2$).

In this embodiment, the cascaded set of second transistor pairs 12 includes five second transistor pairs 12. Each of the second transistor pairs 12 includes a third transistor having a third collector, a third base and a third emitter, and a fourth transistor having a fourth collector coupled to the third base of the third transistor, a fourth base coupled to the third collector of the third transistor, and a fourth emitter. For convenience of illustration, the third and fourth transistors of the second transistor pairs 12 are designated using an increasing order of reference numerals, i.e., $Q_3$, $Q_4$, $Q_5$ ... $Q_{12}$. In FIG. 2, from top to bottom, the third transistors are disposed on the left side of the cascaded set and are designated as $Q_3$, $Q_5$, $Q_7$, $Q_9$, $Q_{11}$, while the fourth transistors are disposed on the right side of the cascaded set and are designated as $Q_4$, $Q_6$, $Q_8$, $Q_{10}$, $Q_{12}$. The third and fourth collectors of the third and fourth transistors ($Q_3$, $Q_4$) of a first one of the second transistor pairs 12 in the cascaded set are coupled to the first and second emitters of the first and second transistors ($Q_1$, $Q_2$) of the first transistor pair 11, respectively. The third and fourth emitters of the third and fourth transistors of each of the first through a second to a last one of the second transistor pairs 12 in the cascaded set are coupled to the third and fourth collectors of an adjacent one of the second transistor pairs 12 in the cascaded set, respectively. Taking the second one of the second transistor pairs 12 in the cascaded set as an example, the third base of the third transistor ($Q_5$) is coupled to the fourth collector of the fourth transistor ($Q_6$) the fourth base of the fourth transistor ($Q_6$) is coupled to the third collector of the third transistor ($Q_5$), the third emitter of the third transistor ($Q_5$) is coupled to the third collector of the third transistor ($Q_7$), and the fourth emitter of the fourth transistor ($Q_6$) is coupled to the fourth collector of the fourth transistor ($Q_8$). The other ones of the second transistor pairs 12 are coupled to each other in a similar manner. Finally, an output resistor (R) has a first terminal coupled to the fourth emitter of the fourth transistor ($Q_{12}$) of a last one of the second transistor pairs 12 in the cascaded set, and a grounded second terminal. The third emitter of the third transistor ($Q_{11}$) of the last one of the second transistor pairs 12 in the cascaded set is grounded. A voltage output ($V_{TEMP}$) is measured across the output resistor (R), and is the emitter voltage difference between the fourth and third transistors ($Q_{12}$), ($Q_{11}$).

Furthermore, each of the five second transistor pairs 12 has a respective second emitter-base junction ratio between the third transistor and the fourth transistor thereof. As shown in FIG. 2, the second emitter-base junction ratios of the second transistor pairs 12 are designated using an increasing order of reference numerals, i.e., $N_2$, $N_3$, $N_4$, $N_5$ and $N_6$ from top to bottom. $N_2$ is the second emitter-base junction ratio between the transistors ($Q_4$), ($Q_3$). $N_3$ is the second emitter-base junction ratio between the transistors ($Q_5$), ($Q_6$). $N_4$ is the second emitter-base junction ratio between the transistors ($Q_8$) ($Q_7$). $N_5$ is the second emitter-base junction ratio between the transistors ($Q_9$), ($Q_{10}$). $N_6$ is the second emitter-base junction ratio between the transistors ($Q_{12}$) ($Q_{11}$). When the emitter-base junctions of the transistor ($Q_3$), ($Q_6$), ($Q_7$), ($Q_{10}$), ($Q_{11}$) are set to 1, the emitter-base junctions of the transistors ($Q_4$), ($Q_5$), ($Q_8$), ($Q_9$), ($Q_{12}$) are selected so that the magnitudes of the second emitter-base junction ratios of the second transistor pairs 12 are arranged in the following sequence: $N_2$, $N_3$, $N_4$, $N_5$, $N_6$.

Therefore, by virtue of KVL, the following equation can be obtained:

$$V_{BE11}+V_{BE10}+V_{BE7}+V_{BE6}+V_{BE3}+V_{BE2}-V_{BE1}-V_{BE4}-V_{BE5}-V_{BE8}-V_{BE9}-V_{BE12}=V_{TEMP} \quad (4)$$

It is known that when a bipolar junction transistor operates in the forward active region, the base-emitter voltage thereof is as follows:

$$V_{BE} = V_T \ln\left(\frac{I_C}{I_S}\right).$$

wherein $I_C$ is the transistor collector current, and $I_S$ is the transistor saturation current and is proportional to the size of the emitter-base junction of the transistor.

Therefore, equation (4) can be rewritten as follows:

$$V_{TEMP} = V_T \ln\left(\frac{I_{C11}}{I_{S11}} \times \frac{I_{C10}}{I_{S10}} \times \frac{I_{C7}}{I_{S7}} \times \frac{I_{C6}}{I_{S6}} \times \right.$$

-continued $$\frac{I_{C3}}{I_{S3}} \times \frac{I_{C2}}{I_{S2}} \times \frac{I_{S1}}{I_{C1}} \times \frac{I_{S4}}{I_{C4}} \times \frac{I_{S5}}{I_{C5}} \times \frac{I_{S8}}{I_{C8}} \times \frac{I_{S9}}{I_{C9}} \times \frac{I_{S12}}{I_{C12}})$$

wherein $I_{C1}, I_{C2}, \ldots I_{C12}$ are the collector currents of the transistors $(Q_1), (Q_2), \ldots (Q_{12})$, respectively, and $I_{S1} \sim I_{S12}$ are the saturation currents of the transistors $(Q_1) \sim (Q_{12})$ respectively. Since the current gain of each transistor $(Q_1)$, $(Q_2), \ldots (Q_{12})$ is relatively large, the base currents thereof can be considered to be negligible. Therefore, the first current $(I_1)$ flows through the transistors $(Q_1, Q_3, Q_5, Q_7, Q_9, Q_{11})$. Assuming that the current flowing through the transistors $(Q_2, Q_4, Q_6, Q_8, Q_{10})$ is a second current $(I_2)$ then $I_{C1}=I_{C3}=I_{C5}=I_{C7}=I_{C9}=I_{C11}=I_1$, and $I_{C2}=I_{C4}=I_{C6}=I_{C8}=I_{C10}=I_2$.

Thus, equation (4) can be further rewritten as $$V_{TEMP} = V_T \ln\left(\frac{I_1}{I_{S11}} \times \frac{I_2}{I_{S10}} \times \frac{I_1}{I_{S7}} \times \frac{I_2}{I_{S6}} \times\right.$$
$$\left.\frac{I_1}{I_{S3}} \times \frac{I_2}{I_{S2}} \times \frac{I_{S1}}{I_1} \times \frac{I_{S4}}{I_2} \times \frac{I_{S5}}{I_1} \times \frac{I_{S8}}{I_2} \times \frac{I_{S9}}{I_1} \times \frac{I_{S12}}{I_2}\right)$$

and is equivalent to:

$$V_{TEMP} = V_T \ln\left(\frac{I_{S1}}{I_{S2}} \times \frac{I_{S4}}{I_{S3}} \times \frac{I_{S5}}{I_{S6}} \times \frac{I_{S8}}{I_{S7}} \times \frac{I_{S9}}{I_{S10}} \times \frac{I_{S12}}{I_{S11}}\right) \quad (5)$$

Since the saturation current of a transistor is proportional to the size of the emitter-base junction as mentioned hereinabove, $(I_{S1}/I_{S2})$ is equal to $(N_1)$ which is the first emitter-base junction ratio between the first transistor $(Q_1)$ and the second transistor $(Q_2)$ $(I_{S4}/I_{S3})$ is equal to $(N_2)$, which is the second emitter-base junction ratio between the fourth transistor $(Q_4)$ and the third transistor $(Q_1)$. Accordingly, the other saturation current ratios in equation (5) can be expressed in terms of the ratios $(N_3)$ to $(N_6)$. Thus, equation (5) can be rewritten as follows:

$$V_{TEMP} = V_T \ln(N_1 \times N_2 \times N_3 \times N_4 \times N_5 \times N_6) \quad (6)$$
$$= 26\text{mV} \cdot \left(\frac{T}{300° K}\right) \cdot \ln(N_1 \times N_2 \times N_3 \times N_4 \times N_5 \times N_6)$$

Therefore, the emitter voltage $(V_{TEMP})$ at the fourth transistor $(Q_{12})$ is a function of the first emitter-base junction ratio $(N_1)$, the second emitter-base junction ratios $(N_2, N_3, N_4, N_5, N_6)$, and the value of the temperature $(T)$ to be measured, and is not affected by inaccuracies in the resistance of the resistor $(R)$. Furthermore, since the emitter voltage $(V_{TEMP})$ is a natural logarithm of the product of all of the emitter-base junction ratios, and since the rate of change of $\ln(X)$ is $1/X$, when $X$ becomes bigger, the rate of change of $\ln(X)$ becomes smaller accordingly. Therefore, errors attributed to improperly matched transistors can be effectively lowered. As the emitter-base junction ratio of each transistor pair can be controlled during manufacturing, the change in the output voltage $(V_{TEMP})$ in response to the measured temperature $(T)$ can be controlled as well. The temperature sensing circuit 1 is thus capable of accurate temperature measurement.

As an example of this embodiment, it is assumed that $N_1=N_2=N_3=8$ and $N_4=N_5=N_6=6$. Equation (6) thus becomes:

$$V_{TEMP} = 26\text{mV} \cdot \left(\frac{T}{300° K}\right) \cdot \ln(8 \times 8 \times 8 \times 6 \times 6 \times 6)$$
$$= 302\text{mV}\left(\frac{T}{300° K}\right)$$

It is therefore evident that the temperature sensing circuit 1 according to the present invention can be configured such that, under the condition that the emitter-base junction ratio of each transistor pair is smaller than 10, the output voltage $(V_{TEMP})$ can rise by 1mv in response to a rise of 1 degree kelvin in the measured temperature $(T)$.

While only five second transistor pairs 12 are presented in the foregoing embodiment, in actual practice, the number of second transistor pairs 12 in the cascaded set may be more than five. Under such a situation, $V_{TEMP}=V_T\ln(N_1 \times N_2 \times N_3 \times N_4 \times N_5 \times N_6 \times N_7 \times \ldots)$.

Therefore, if the design requires that the output voltage $(V_{TEMP})$ should change by a larger value, such as 5 mv, in response to a rise of 1 degree kelvin in the measured temperature $(T)$, the number of the second transistor pairs 12 in the cascaded set can be increased accordingly. As such, while maintaining matching current gains of the transistors $(N<10)$ so as not to lose the characteristics thereof, appropriate adjustment of the emitter-base junction ratio of each transistor pair and the number of the second transistor pairs 12 in the cascaded set can result in a large product of the emitter-base junction ratios.

Figure 4:
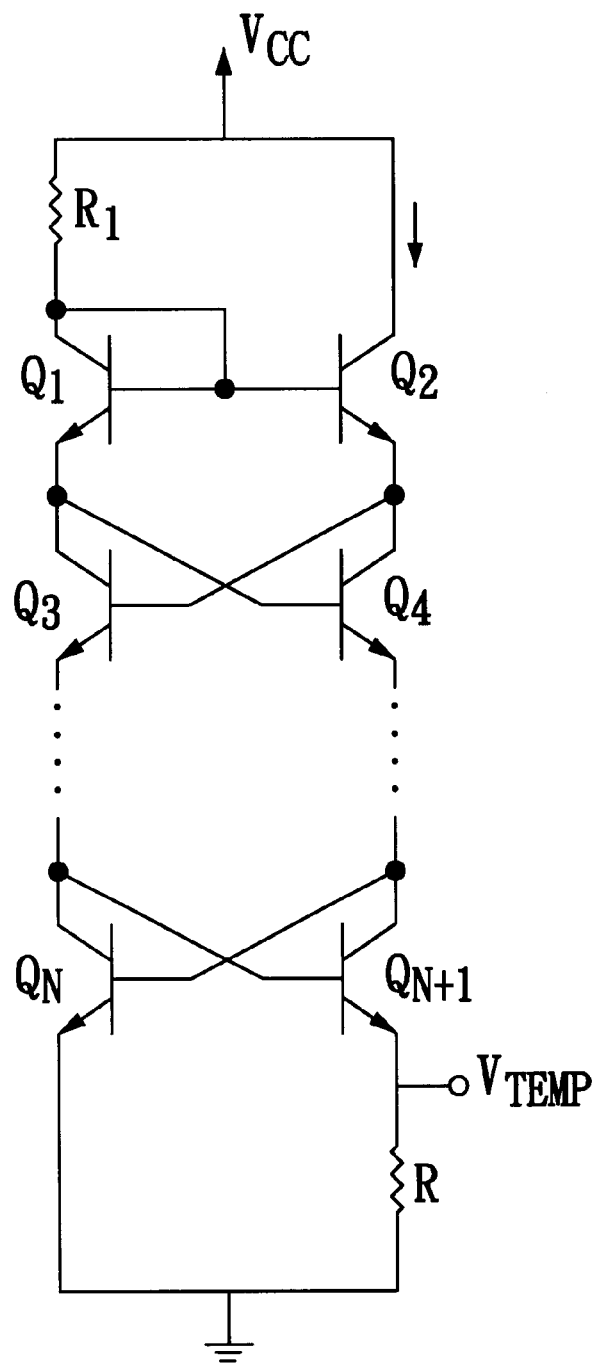
FIG. 4 is a circuit diagram illustrating the temperature sensing circuit according to the present invention embodied with one example of a current source.

Referring to FIG. 3, in practice, a transistor with an N-times emitter-base junction is equivalent to a number (N) of transistors with unity emitter-base junctions and having collectors that are coupled together, emitters that are coupled together, and bases that are coupled together. In this manner, transistors having emitter-base junctions of different sizes can be easily obtained. Furthermore, the current source $(I_{REF})$ may be implemented in many ways. As shown in FIG. 4, the current source may include a source resistor $(R_1)$ coupled to the first collector and adapted to be coupled to a voltage source. As shown in FIG. 5, the current source may include a known current mirror 13 coupled to the first and second collectors and adapted to be coupled to a voltage source.

In the previous embodiments, the transistors are npn bipolar junction transistors. FIG. 6 illustrates another embodiment of the temperature sensing circuit of this invention. In the embodiment of FIG. 6, the transistors between the voltage source (Vss) and the ground point are pnp bipolar junction transistors. The effect achieved in this embodiment is the same as that in the previous embodiments.

In summary, the temperature sensing circuit 1 of this invention eliminates inaccuracies attributed to incorrect resistance values, greatly lowers errors due to transistor mismatch, and reduces the adverse effect of errors inherent in the manufacturing process. Furthermore, by controlling the emitter-base junction ratio of each transistor pair and the number of the second transistor pairs in the cascaded set, the change in the output voltage $(V_{TEMP})$ in response to a rise of 1 degree kelvin in the measured temperature $(T)$ can be flexibly controlled. The design and range of use of this invention are therefore highly flexible.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A temperature sensing circuit comprising:

a current source for providing a bias current;

a first transistor pair coupled to said current source, and including a first transistor having a first collector, a first base coupled to said first collector, and a first emitter, and second transistor having a second collector, a second base coupled to said first base of said first transistor, and a second emitter, said first transistor pair having a first emitter-base junction ratio between said first transistor and said second transistor;

a cascaded set of second transistor pairs, a first one of said second transistor pairs in said cascaded set being coupled to said first transistor pair, each of said second transistor pairs including a third transistor having a third collector, a third base and a third emitter, and a fourth transistor having a fourth collector coupled to said third base of said third transistor, a fourth base coupled to said third collector of said third transistor, and a fourth emitter, said third and fourth emitters of said third and fourth transistors of each of said first through a second to a last one of said second transistor pairs in said cascaded set being coupled to said third and fourth collectors of an adjacent one of said second transistor pairs in said cascaded set, respectively, each of said second transistor pairs having a respective second emitter-base junction ratio between said third transistor and said fourth transistor thereof, a voltage output, which corresponds to temperature sensed by said temperature sensing circuit and which is a function of the first emitter-base junction ratio of said first transistor pair and the second emitter-base junction ratios of said second transistor pairs, being obtained from said third and fourth emitters of the last one of said second transistor pairs in said cascaded set, and an output resistor having a first terminal coupled to one of said third and fourth emitters of the last one of said second transistor pairs in said cascaded set, and a grounded second terminal, the other one of said third and fourth emitters of the last one of said second transistor pairs in said cascaded set being grounded, said voltage output being measured across said output resistor.

2. The temperature sensing circuit as claimed in claim 1, wherein said third and fourth collectors of said third and fourth transistors of the first one of said second transistor pairs in said cascaded set are coupled to said first and second emitters of said first and second transistors of said first transistor pair, respectively.

3. The temperature sensing circuit as claimed in claim 1, wherein each of said first, second, third and fourth transistors is a bipolar junction transistor.

4. The temperature sensing circuit as claimed in claim 1, wherein each of said first, second, third and fourth transistors is an npn biopolar junction transistor.

5. The temperature sensing circuit as claimed in claim 1, wherein each of said first, second, third and fourth transistors is a pnp bipolar junction transistor.

6. The temperature sensing circuit as claimed in claim 1, wherein said current source includes a source resistor coupled to said first collector and adapted to be coupled to a voltage source.

7. The temperature sensing circuit as claimed in claim 1, wherein said current source includes a current mirror coupled to said first and second collectors and adapted to be coupled to a voltage source.

* * * * *